[11] 3,621,349

[72] Inventor Philippe Reyx
 Grenoble, France
[21] Appl. No. 49,049
[22] Filed June 23, 1970
[45] Patented Nov. 16, 1971
[73] Assignee Merlin Gerin, Societe Anonyme of Rue
 Henri Tarze
 Grenoble, France
[32] Priority July 2, 1969
[33] France
[31] 6,922,905

[54] LINEAR INDUCTION MOTOR SYSTEM FOR
 SLIDING DOOR PANEL MOVEMENT CONTROL
 5 Claims, 7 Drawing Figs.
[52] U.S. Cl. .................................................... 318/135,
 310/13, 49/360
[51] Int. Cl. ............................................ H02k 41/02
[50] Field of Search ......................................... 318/135,
 121, 225, 221, 220; 224; 301/12-14, 19; 49/360;
 104/148, 148 LM

[56] References Cited
 UNITED STATES PATENTS
| | | | |
|---|---|---|---|
| 1,950,611 | 3/1934 | Hedley et al. | 310/13 |
| 2,412,515 | 12/1946 | Jones et al. | 318/135 |
| 2,412,514 | 12/1946 | Jones | 318/135 |
| 2,112,264 | 3/1938 | Bowles et al. | 310/13 X |
| 3,462,883 | 8/1969 | Reeks et al. | 310/19 X |

*Primary Examiner*—D. F. Duggan
*Attorney*—Stevens, Davis, Miller and Mosher

ABSTRACT: A system for opening and closing sliding doors comprising a linear induction motor having two field windings, a braking device, a plurality of detectors actuated in accordance with the position of the door and a switch sensitive to the approach of persons or objects toward the door. A control circuit is provided which controls the direction of movement and speed of the door as a function of the positions of the detectors and switch by selectively actuating the field windings and braking device.

PATENTED NOV 16 1971                    3,621,349

LINEAR INDUCTION MOTOR SYSTEM FOR SLIDING DOOR PANEL MOVEMENT CONTROL

This invention relates to a system for sliding door panel movement control.

Convenience and reliability factors are responsible for the increasing use of automatically controlled doors, for example the glass-panelled sliding doors used in buildings in which the door slides open automatically immediately anyone enters or is present in the detection zone near the door. It is conventional to use pneumatic or hydraulic operating systems using actuators coupled with the panel, but systems of this kind need a pressure fluid source, e.g. in the form of a motor-compressor set and a pressure fluid reservoir. Auxiliary equipment of this kind is justifiable only in installations comprising a number of grouped automatic doors and maintenance is difficult.

Electrically driven facilities using a rotating motor require conversion of the rotation into a rectilinear motion in a manner unsuitable for the rapid operation and response needed in control systems of this kind, for example for stopping the door in the event of an obstacle impeding closure.

It is an object of this invention to provide an automatically operated sliding door system using a linear induction motor.

U.S. Pat. spec. No. 1,950,611 has already disclosed such a system, devised more particularly for opening and closing the door of a transportation vehicle. In this known system door movement is braked mechanically at the end of door travel by brake shoes released by interruption of the supply to the electric motor. This feature precludes abrupt stoppage and prevents the door from striking the door frame. A system of this kind cannot provide accurate stopping at particular points at the end of the closing and opening movements of the door, whatever the conditions may be in which the movement is made, for example if door movement has been hindered or retarded by an obstacle or by accidental friction, since the mechanical braking distance varies with the speed of the moving object to be braked. This accurate stopping problem arises with all doors and is a particularly difficult problem with long heavy panels, more particularly for the glass-panelled doors used in buildings and unable to withstand impacting, and still more particularly when the door is of the kind in which two glass panels abut one another when the door is in the closed position.

It is another object of the invention to provide an operating system which is highly reliable and which provides a definite level of accuracy in stoppage and positioning.

U.S. Pat. No. 3,462,883 discloses an improved operating system for the sliding door of lifts, the acceleration and deceleration of the doors being under the control of a complex electronic system using, for example a door panel speed detector. The deceleration is produced by reversing the motor current and so, as will become clearer hereinafter, this known facility cannot ensure stoppage of the closing movement anywhere on the path and reopening of the door just by giving the normal opening signal.

It is another object of the invention to provide a simple facility ensuring that the door always closes and opens fully with complete safety.

According to the invention, the door paths are subdivided into sections, and each path section has associated with it a control sequence of the linear electric motor of a panel-opening program and of a panel-closing program, such programs being automatically selected by a detector sensitive to the presence or absence of an article or person in a detection zone near the panel, so that an opening operation and a closing operation correspond to each panel position, the opening operation being selected by the presence signal from the detector and the closing operation being selected in the absence of such presence signal. The general principle makes it unnecessary to use any kind of store, the disadvantage of which is failure in the event of even a transient failure of the power supply.

The door panel position detectors deliver the movement programming set values which are superimposed upon the "open" or "closed" instruction given by the extrinsic signal of the detector indicating the presence or absence of someone in the door approach zone so as to initiate a sequence of operations leading to the instructed movement being performed satisfactorily.

The linear motor field structure is subdivided into two more parts adapted to be energized separately and selectively and of different driving powers. During the panel starting and acceleration sequence, both parts of the field are energized simultaneously to provide maximum thrust.

The facility comprises a brake system, e.g. in the form of an induced-current electromagnetic brake which brakes more intensely in proportion as panel speed is greater. The panel therefore always approaches its end-of-travel section at a substantially constant speed and stops exactly at a desired open station and closed station each embodied by an abutment and possibly some form of locating device. In the deceleration sequence only the low-power part of the field structure and the electromagnetic brake are energized. Clearly, the armature, depending on its speed, will be either retarded or accelerated according to whether the braking force is higher or smaller than the driving force, but all that the motor can impart to the panel is an operative movement in the direction of the drive, as would of course not be the case if, as suggested by U.S. Pat. No. 3,462,883 braking was produced by reversing the motor current.

According to the invention, the electromagnetic brake can be embodied by the inoperative part of the field structure, such part being energized by DC or single-phase AC to provide braking.

The invention is particularly well suited to the operation of sliding doors, preferably of the kind having two moving panels and used in building, although the door can of course be of some other kind, for instance, a single panel door, a concertina door, a vertically operating door, a vehicle door, a lift door etc.

Other advantages and features of the invention will be disclosed by the following exemplary nonlimitative description of an embodiment of the invention shown in the accompanying drawings wherein.

Figure 3:
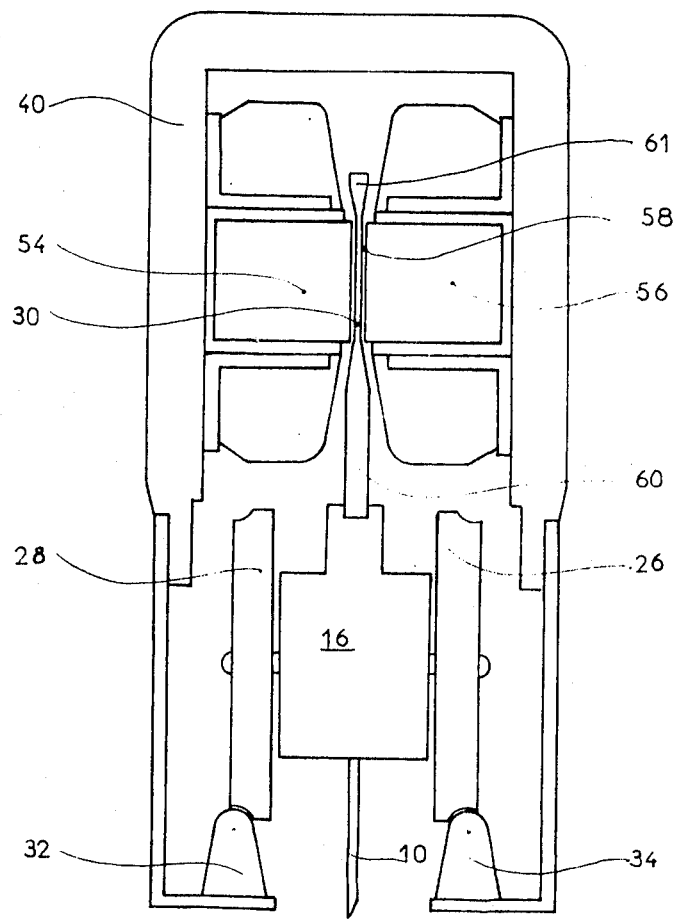
FIG. 3 is a left-hand view to an enlarged scale of the facility shown in FIG. 2.

Referring to the drawings, a door has two panels 10, 12 adapted to move rectilinearly and in opposite directions so as either to abut one another for the closed position of the door or to move away symmetrically from one another to open the door, for instance for entering or leaving a building. Each panel 10, 12, which can be just of glass, is top-hung on a carriage 16 having two spaced-apart spindles 18, 20 each bearing a roller pair 22, 24 and 26, 28 respectively, as can be seen in FIG. 3. The two panels 10, 12 are identical to one another, as are their respective suspension systems, and so a description will be given hereinafter of only one such panel and system in order to keep the description simple. The carriage 16 is shaped or bears rigidly a plate 30 which is placed above panel 10 and which is longer than the travel thereof. Plate 30 is made of an electrically conductive and preferably nonmagnetic material such as copper or aluminum. Rollers 22–28 run on two runways 32, 34 of a suspension beam 40.

Magnetic circuits 54, 56 secured to beam 40 are disposed on either side of the plate 30 over some of its length; between the circuits 54 and 56 is an airgap 58 in which the plate 30 can move, but without contacting the airgap surfaces, when the carriage 16 moves. The top and bottom edge zones 60, 61 of plate 30 are thicker than the remainder thereof to increase the induced current flow in the plate.

Each circuit 54, 56 is formed with slots (not shown) which, in a manner familiar to the skilled addresses, receive polyphase winding conductors adapted to produce a transverse magnetic field in the airgap 58, such field moving along the runways 32, 34. The windings of each circuit 54, 56 are subdivided into at least two independent parts 70, 72 each forming a field winding means adapted to be energized independently of the other field winding means, the driving powers of the two field portions being, with advantage, different from one another. The kind of field winding used can be as disclosed by U.S. Pat. application Ser. No. 879,873 of Nov. 25, 1969, which can, with advantage, be referred to for further details.

As will be readily apparent, the system just described forms a linear induction motor in which the plate 30 forms the armature; depending upon the direction in which windings 70, 72 are energized, the armature 30 moves to one or the other hand and, via the carriage 16, moves the panel 10 towards the open position or close position. The direction of movement can be reversed conventionally by reversing two phases of the polyphase energization of the field winding 70, 72. Driving power is maximum when the two windings 70, 72 are energized simultaneously.

A horseshoe electromagnet 64 juxtaposed with the circuits 54, 56 straddles the plate 30, which can move through the airgap of electromagnet 64. When energized by AC or DC the winding 66 of electromagnet 64 produces a stationary magnetic field which by induction brakes the movement of the plate 30.

In all positions of panel 10 a portion of plate 30 cooperates with the drive element 70, 72 and the electromagnet brake 64. Consequently, the length of the armature plate 30 is greater than panel travel, and if there are two panels 10, 12 concerned in the closure, the associated plates 30 must be offset. To obviate any such elongation of plate 30 and the consequent offset, two electromagnetic brakes can be used which are disposed at intervals along the path of plate 30 so that at least one of the two brakes can be operative.

Figure 7:
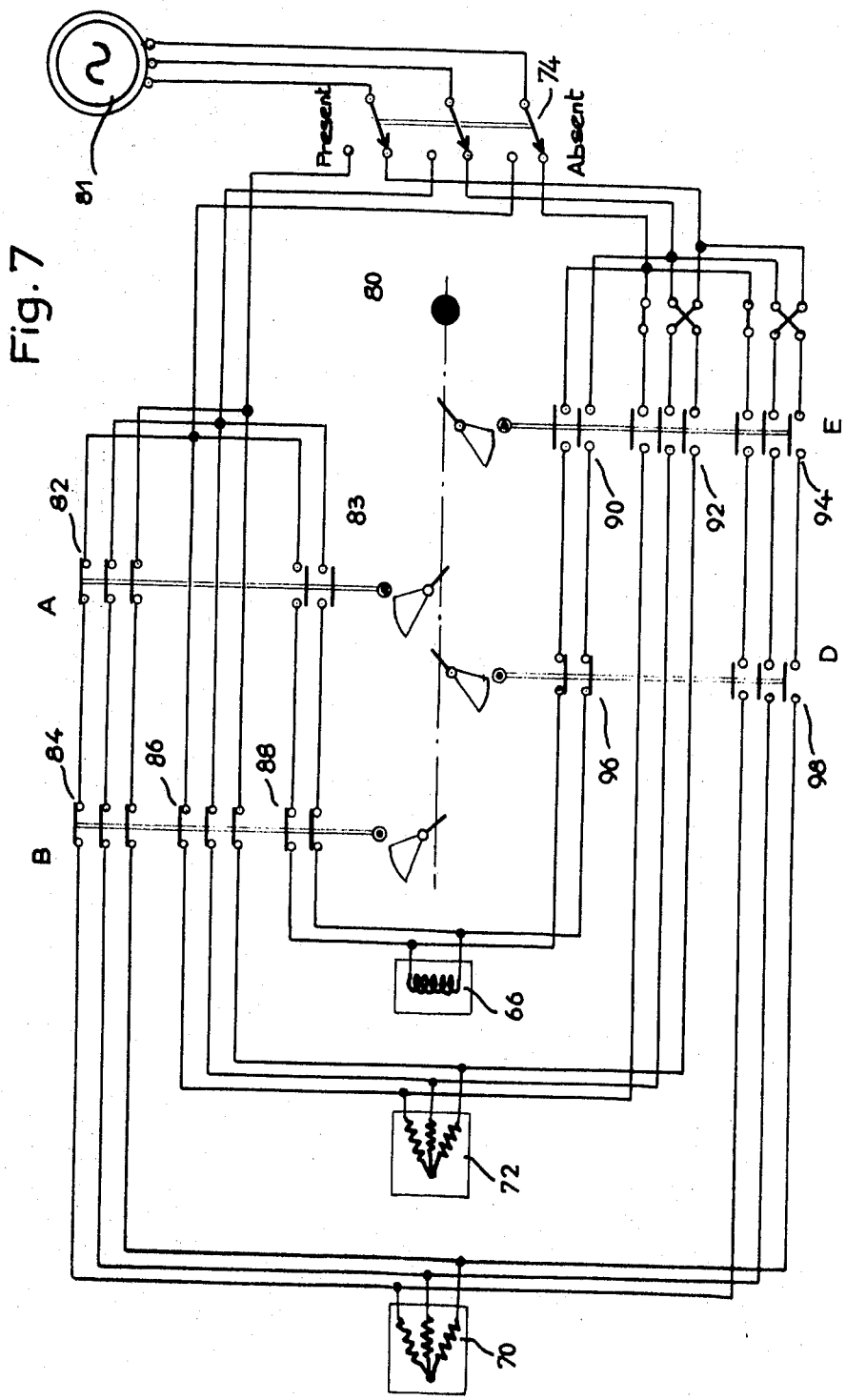
FIG. 7 is an automatic control circuit diagram with the contacts shown in position and the door closed.

Four detectors A, B, D, E for detecting the position of the plate 30-i.e., of the panel 10-are disposed at intervals along the path of plate 30 and subdivide such paths into various sections. The detectors A, B, D, E can be of any kind with mechanical or inductive or similar operation of the contacts. In the example shown in FIG. 7, each detector A, B, D, E has a bistable lever operated by the passage of an actuating finger 80 on plate 30 and controlling contacts in the supply circuits for the field 70, 72 and for the electromagnet 64.

Figure 5:
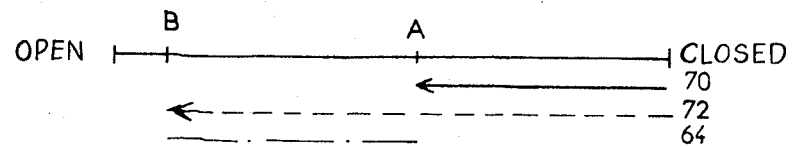
FIGS. 5 and 6 show the energization phases of the linear motor and electromagnetic brake over the various sections of the door-opening and door-closing paths.
Figure 6:
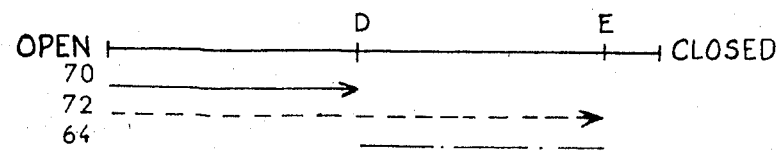
Figure 4:
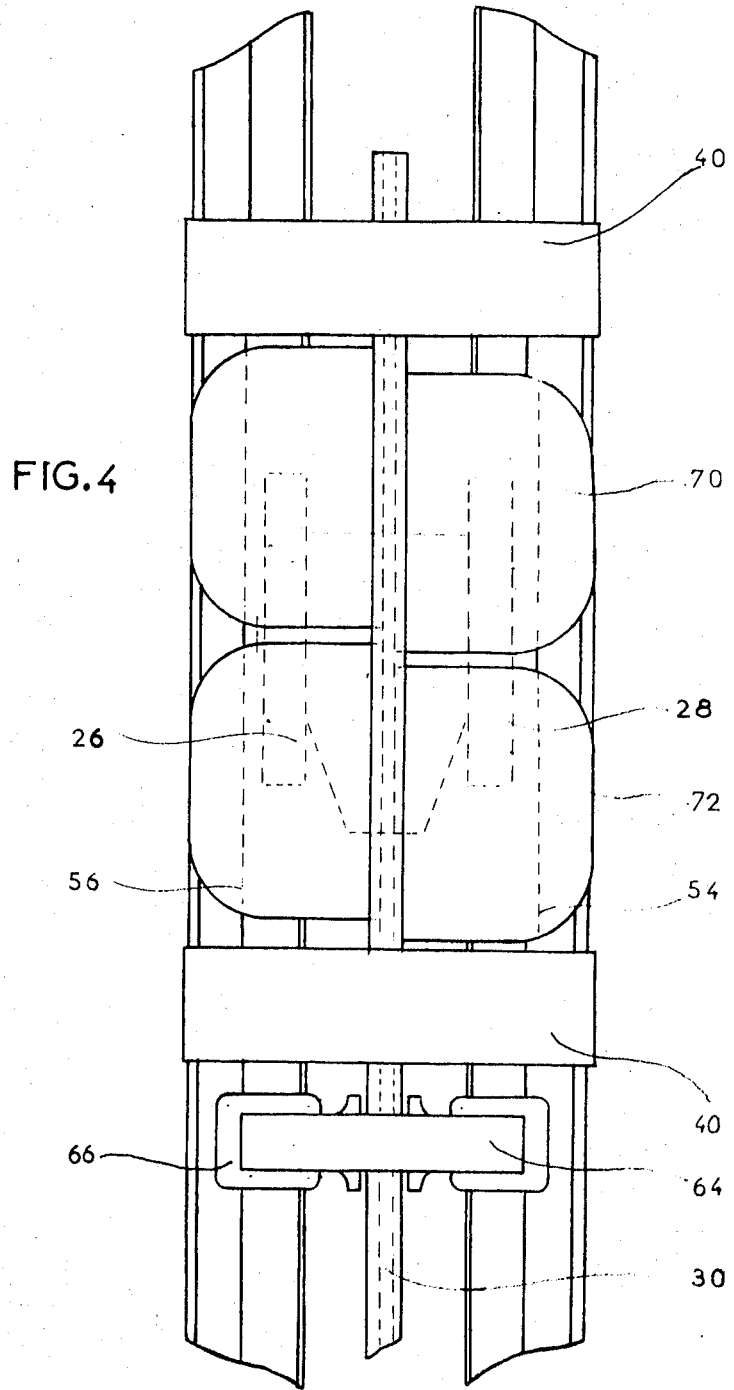
FIG. 4 is a partial plan view to an enlarged scale of the propulsion system shown in FIGS. 2 and 3.

Two detectors A, B are associated with control of the opening of panel 10 and determine three sequences of the opening program, which is diagrammatically shown in FIG. 5, and two detectors D, E program the closure travel which is shown in FIG. 6.

Figure 1:
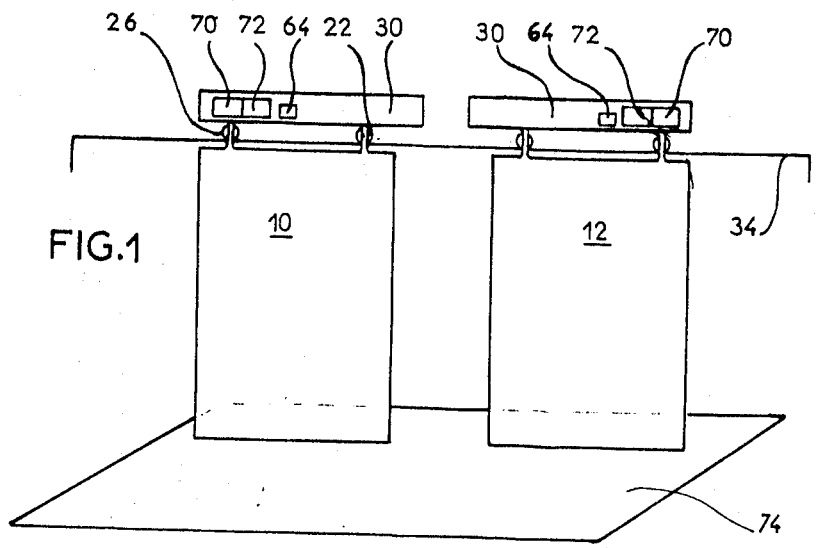
FIG. 1 is a diagrammatic view of a two-panel sliding door, each panel being operated by a linear motor according to the invention.
Figure 2:
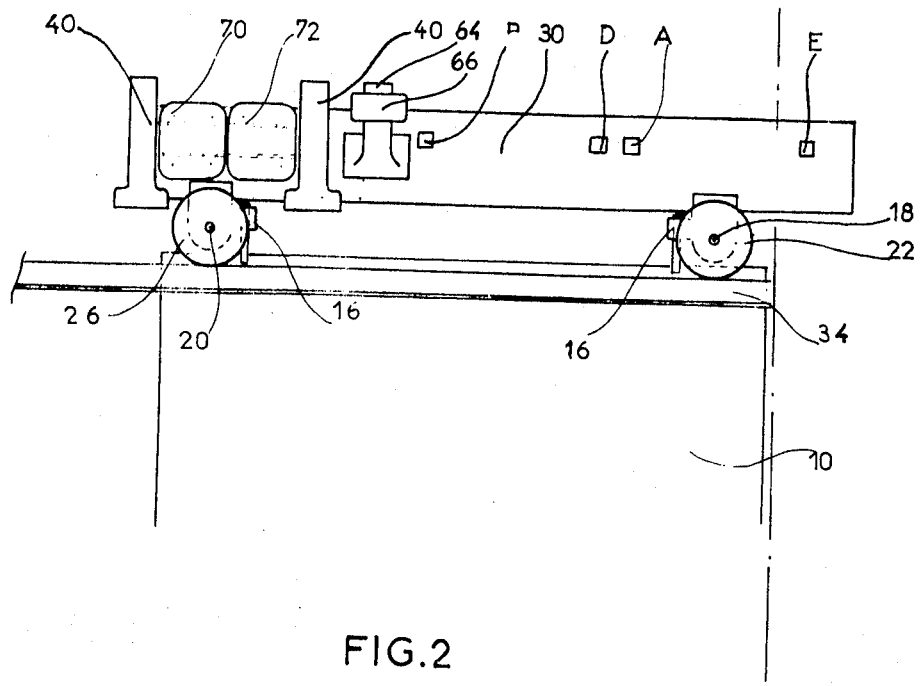
FIG. 2 is a view in elevation of the top support and propulsion part of one of the panels shown in FIG. 1, the support beam for the runways not being shown.

Disposed in the zone near the door is program selection means comprising a voluntary or involuntary control member, for example a presence detector 74 (FIG. 1), which is of a well-known kind, for instance, of the kind in which a carpet operates a contact when trodden on by a person or of the kind using photoelectric barriers. Immediately or for as long as a person is near the door, detector 74 outputs a door-opening signal, and a delayed instruction or the disappearance of the door-opening signal triggers the door-closing operation. The circuit diagram shown in FIG. 7, which can vary, provides for the following operations:

When the detector 74 outputs a presence signal, the following sequences are initiated in dependence upon the position of the panel and therefore of the finger 80:

When panel 10—i.e. plate 30—is in the section bounded by the closed position and the detector A (the position shown in FIG. 7), both the field portions 72, 70 are energized by a polyphase current 81 by way of the contact 74 in the presence position, closed contacts 82 of detector A and closed contacts 84, 86 of detector B. The resulting field moves in the door-opening direction indicated by the solid-line and broken-line arrows in FIG. 5, and the door open rapidly.

When panel 10 is positioned in the section A-B, only the low-power field portion 72 is energized by a polyphase current to move panel 10 towards the open position, the contact 82 having opened and thus disconnected the higher-power field part 70. The driving power is therefore less than was applied to the panel in the acceleration section from "closed" to position A, and panel movement is further decelerated because contact 83 of detector A on this section has closed with the result that brake 64 is energized and produces a stationary magnetic field, which acts by induction on the moving armature 30 to produce a braking force proportional to the speed of such movement and tending to oppose the same, in known manner. The braking force and driving force oppose one another, the driving force always predominating when the armature is moving slowly so that armature movement is always completed, even in the case of accidental braking e.g. by a transient obstacle or the like, and the panel comes to the open position.

In the section which extends from position B to "open" and which corresponds to the end of the opening movement, the contacts 84, 86, 88 of detector B drop to deenergize both the field portions 70, 72 and the brake 64, stoppage being completed by a mechanical stop. Some form of mechanical locating facility (not shown), e.g. a projection on the track, secures panel 10 in the open position. The panel always reaches position B at substantially the same speed, whatever the previous movement sequence, since the panel has been decelerated electromagnetically by a stationary magnetic field in proportion to the speed at which the panel was moving when it entered the deceleration zone and while it was present therein. The striking of the end-of-travel abutment can therefore be adapted to suit the fragility of the apparatus.

If the presence signal from the presence detector 74 disappears, the control system initiates the following operations, according to the position of the panel 10 or armature 30 on the closure path (FIG. 6):

When the panel 10 is disposed between the "open" position and the detector D, the contacts 90, 92, 94 of detector E and contact 98 of detector D are all closed, and the field portions 72, 70 are energized by a polyphase current producing a field moving in the door-closing direction, and brake 64 is deenergized.

When panel 10 is in the section D-E, the low-power field portion 72 is energized by a polyphase current and produces a door-closing force, whereas portion 70 is deenergized due to contact 98 of detector D being open. Brake 64 is energized, by closure of contact 96 of detector D, to brake panel 10 in a manner similar to what has been previously described. In the section from position E to the "closed" position, the field portions 70, 72 and the brake 64 are deenergized by the contacts 90, 92, 94 of detector E opening, and a mechanical locating facility secures panel 10 in the closed position. The same is always presented to position E at the same speed, whatever the previous movement sequence may have been, since the panel 10 has been decelerated electromagnetically by a stationary magnetic field in proportion to the speed at which the panel was travelling when it entered the deceleration zone and while it was present therein.

The control system according to the invention is very simple, and a definite phase of the movement program corresponds to each position of panel 10 in dependence upon the presence signal 74.

The control system according to the invention operates as follows:

When the door is in the closed position, the opening signal is given by detector 74 when someone is near the door, such signal continuing until the person has passed through the door opening and left the detection zone. The presence signal 74 initiates the opening program under the control of the position detectors A, B (FIG. 5). The field portions 70, 72 are both energized while the panel travels through the sections from the closed position to position A so that the door starts its movement and accelerates rapidly. When the section A–B is reached, field portion 70 is deenergized so that the door does not move too fast, the door then continuing its opening movement by inertia and with the help of the still energized field portion 72. This movement is retarded by the brake 64 being energized. Braking predominates over the drive force while panel speed remains high, and the moving system gradually decelerates in the section A–B. The brake 64 and the field portions 70, 72 are deenergized at position B and the panel 10 is secured open by a substantially constant mechanical location.

Door closing is in accordance with the program shown in FIG. 6 and is triggered by disappearance of the signal 74, for instance, when the person who caused the opening leaves the detection zone. With the door open, the field portions 70, 72 are energized to move the panel 10 towards the closed position. When the section D–E, corresponding to the deceleration section, is reached, the field portion 70 is deenergized and the brake 64 energized as hereinbefore described, the field portion 72 continuing to received a polyphase drive current. At the end-of-travel from position E to the closed position the abutment secures the panel 10 accurately in the closed position.

The closing program is similar to the opening program, the position of the detectors A and D being determined in dependence upon door characteristics.

The presence signal can start or disappear before the end of a door operation, for instance, if a second person comes up to a door which has just opened for a first person and which has started to close. Clearly, the control system according to the invention interrupts the closing operation and initiates reopening immediately, whatever the position of the door on its path. It will be assumed, for instance that the presence detector gives an open instruction while the panel is making its closing movement in the section D–E. Before the open signal was given, the field portion 72 was being energized by a polyphase current producing a closure force, while the brake 64 was energized and was tending to retard the movement produced by field portion 72 (FIG. 6). The appearance of the open signal causes the closing program of FIG. 6 to be replaced by the opening program of FIG. 5, with the result that the energization phase order for field portion 72 is reversed, so that the drive is reversed and, depending on whether or not the panel 10 has already passed the detector A, the field portion 70 is either energized too and helps to produce the closing movement or is deenergized, in which event the brake 64 is energized. The panel movement is rapidly retarded by the oppositely acting driving force, the panel then starting a normal opening operation. Of course, panel speed is less than it is for a full operation since the driving force is operative for less time than in a full operation; however, the deceleration in the section A–B is less too since it is proportional to panel speed, so that the end-of-travel section is approached by the panel at a substantially constant speed.

As FIGS. 5 and 6 show, if an open or close instruction is given to the door when it is anywhere on its closing path or opening path, the motor is always energized so as immediately to urge the panel towards the open position or closed position respectively.

Advantageously, each panel of a door having two panels 10, 12 (FIG. 1) has an individual motor, a common control system being provided for the two motors with provision for synchronizing the movement of the panels 10, 12 by some form of electrical or other link.

Each program can of course comprise more consecutive sequences than described here, for example in the form of graduations in the driving or braking force, to which end resistances can be provided in the energizing circuits or the field can be subdivided into a greater number of separately energizable portions. The relative position of the position detectors A, B, D, E and the strength of the motor supply currents can be variable so that the system can be readily adapted to different kinds of door.

The brake 64 is energized only when the motor winding 70 is not energized; as a variant of the invention, the motor winding 70 can serve as brake by being energized with DC or single-phase AC. This step greatly simplifies the apparatus but can provide only reduced braking forces sufficient for only a few special uses.

The invention has been more particularly described with reference to a stationary field structure co-operating with a moving armature mounted on the door panel; clearly, however, the invention is of use without appreciable modification for a system in which a moving field structure is rigidly secured to the door, the armature being stationary.

The invention is not limited to the embodiment more particularly described and shown by way of example in the accompanying drawing but covers any mechanically and electrically equivalent variant and extends to controlling the movement of any element making an outward and return movement where accurate stopping is required.

What is claimed is:

1. A control system for controlling the movement of a reciprocable member mounted for reciprocation in a support, comprising, a linear induction motor having a field element and an armature element, means guiding said elements for relative linear movement, said field element including at least two separately energizable polyphase field winding means, means for securing one of said elements to said support and the other of said elements to said reciprocable member, polyphase current supply means, an energization and control circuit connected between said field winding means and said current supply means and including first program means to operate the movement of said reciprocable member in one direction and second program means to operate the movement of said reciprocable member in the opposite direction and program selection means operable in one state to activate said first program means and deactivate said second program means and in the other state to activate said second program means and deactivate said first program means, said energization and control circuit further comprising a plurality of position detector means fixed with respect to one of said elements and position detector operating means fixed with respect to the other of said elements, said position detector means being disposed at intervals along the path of movement with respect to said one element, of said position detector operating means, said energization and control circuit further including current connection means controlled by said position detector means whereby in each state of said program selection means, when one of said elements is within a certain distance of the limit of its motion with respect to the other element in one direction, both of said field winding means are connected to said polyphase current supply to urge said elements to effect relative motion in the opposite direction and when said distance from said limit is within a range of distance greater than said certain distance at least one of said field winding means is energized to urge movement in said opposite direction and at least one other of said field windings is not energized, the respective said limits for the two states of said program selection means being at opposite ends of the path of one of said elements with respect to the other.

2. The system of claim 1 further including brake means operable between said elements, said energization and control circuit including means for activating said brake means, in each state of said program ranges of relative positions of said elements remote from the associates said limit.

3. The control system of claim 2 wherein the energization and control circuit comprises means for single-phase AC or for DC energization of one of said field winding means at least in some of the range of positions beyond said certain distance of said limit in at least one state of the program selection means so as to provide an eddy current braking force.

4. The control system of claim 2 wherein said brake means comprises an electromagnetic circuit which is mechanically secured to the field element and which has a winding adapted to produce a stationary magnetic field, the armature element moving in such field and being retarded by the eddy currents produced in it.

5. The control system of claim 2 comprising two said position detectors associated with the said first program means and two detectors associated with the said second program means, the detectors subdividing the path of said elements into three consecutive sections for starting and acceleration, deceleration and stopping respectively, the control circuit comprising the polyphase current energization means for said two field winding means in the starting and acceleration section, means for energizing the braking system, and means for energizating with polyphase current only a single field portion in the deceleration section.

* * * * *